United States Patent [19]
Lähdemäki

[11] Patent Number: 5,477,535
[45] Date of Patent: Dec. 19, 1995

[54] METHOD OF PREVENTING A DIVERGENCE OF AN ADAPTIVE ECHO CANCELLER IN A NOISY SIGNAL ENVIRONMENT

[75] Inventor: Heimo Lähdemäki, Pirkkala, Finland

[73] Assignee: Nokia Telecommunications OY, Espoo, Finland

[21] Appl. No.: 387,619

[22] Filed: Feb. 13, 1995

Related U.S. Application Data

[63] Continuation of Ser. No. 81,306, filed as PCT/FI92/00285, Oct. 28, 1992, abandoned.

[30] Foreign Application Priority Data

Nov. 4, 1991 [FI] Finland .................... 915198

[51] Int. Cl.⁶ .................... H04B 3/20; H04J 3/00
[52] U.S. Cl. .................... 370/32.1; 379/409
[58] Field of Search .................... 370/6, 24, 32, 370/32.1; 379/388, 390, 406, 409, 410, 411

[56] References Cited

U.S. PATENT DOCUMENTS

| | | | |
|---|---|---|---|
| 4,064,379 | 12/1977 | Horna | 379/411 |
| 4,645,883 | 2/1987 | Horna et al. | 379/406 |
| 4,852,161 | 7/1989 | Hagiwara | 379/410 |
| 4,894,820 | 1/1990 | Miyamoto et al. | 370/32.1 |
| 4,979,163 | 12/1990 | Erving et al. | 370/32.1 |
| 4,998,241 | 3/1991 | Brox et al. | 370/32.1 |
| 5,075,687 | 12/1991 | Chen et al. | 370/32.1 |
| 5,157,653 | 10/1992 | Genter | 370/32.1 |

FOREIGN PATENT DOCUMENTS

| | | | |
|---|---|---|---|
| 0199879 | 11/1986 | European Pat. Off. | H04B 3/23 |
| 182096 | 11/1987 | European Pat. Off. | |

Primary Examiner—Alpus Hsu
Attorney, Agent, or Firm—Cushman Darby & Cushman

[57] ABSTRACT

A method of preventing an adaptive echo canceler from diverging in a noisy environment, including determining an average noise level (−45 dBmO) in the echo path, determining an attenuation ($A_e$) of the echo path and preventing an adaptation of the echo canceller, if the level of the signal ($x(i)$) to be transmitted to the echo path and causing echo ($r(i)$) is lower than a predetermined threshold level, which is to the extent of a preset margin and the echo path attenuation above the average noise level.

6 Claims, 2 Drawing Sheets

METHOD OF PREVENTING A DIVERGENCE OF AN ADAPTIVE ECHO CANCELLER IN A NOISY SIGNAL ENVIRONMENT

This is a continuation of application No. 08/081,306, filed as PCT/FI92/00285, Oct. 28, 1992, which was abandoned upon the filing hereof.

FIELD OF THE INVENTION

The invention relates to a method of preventing a divergence of an adaptive echo canceller in a noisy signal environment.

BACKGROUND OF THE INVENTION

End-to-end connections of a data transmission system, such as a telephone network, often show long transit time delays, in consequence of which echo is observed for instance in the case of normal speech, when a signal is reflected from the far end of a connection back to the talker.

Electric echo is mostly caused by ⅔-wire transformers situated in terminal exchanges of a fixed telephone network or at remote subscribers' stages. Subscribers' lines of a fixed network generally comprise 2 wires for economical reasons. Interconnecting lines between exchanges comprise 4 wires.

An echo canceller is a device for processing a signal, such as a speech signal, so as to reduce echo by subtracting estimated echo from the echo (signal) occurring in a connection. The echo canceller can be either digital or analog. Echo cancelling devices are at present realized by digital signal processing, by means of which it is possible to model echo paths including considerably long transit time delays. Since the echo path in principle is different at each call, it is necessary to apply to an echo canceller a method which always adapts itself to a new echo path at the start of a call. Digital signal processing offers as a solution an adaptive filter, in which the coefficients of the filter modelling the echo path are updated on the basis of a correlation of the speech signal and the returning echo signal.

If a call takes place in a noisy environment, it causes certain problems with the stability of the echo path impulse response model in the echo canceller. Difficulties arise particularly if the far end is noisy and the echo level of the near end low. Divergence then occurs in the impulse response model of the echo canceller on low levels of the signal received from the far end. On the other hand, if the level of the signal received from the far end rises, echo is observed at the far end for a short time because of the diverged model of the echo path, before the echo canceller is converged back to the echo path.

SUMMARY OF THE INVENTION

An object of the invention is to alleviate the described problem.

This is achieved by means of a method according to the invention, which is characterized in that the method comprises steps of:

determining an average noise level in the echo path, determining an attenuation of the echo path and preventing an adaptation of the echo canceller, if the level of the signal to be transmitted to the echo path and causing echo is lowered to a predetermined threshold level, which is to the extent of a predetermined margin and the echo path attenuation above the average noise level.

The basic idea of the invention is that an adaptation of an adaptive filter is prevented before a lowering of the level of the signal transmitted to the echo path causes lowering of the level of the echo signal returning from the echo path to a level that will be covered by the noise occurring on the echo path. The earlier an adaptation is prevented, i.e. the greater the margin which is left between the noise level and the echo signal level, the better the echo path model is preserved in the echo canceller. On the other hand, the margin must not be very large, because, if the signal transmitted to the echo path had a low level for a longer time and a slow change occurred at the same time in the echo path, the consequence would also then be an incorrectness to some degree of the echo path model of the echo canceller. However, a reasonable margin is of clear benefit, because with prevented adaptation the positions and signs of the coefficients of the impulse response model remain correct, though their absolute values would be distorted as a consequence of a change in the echo path. When the positions and signs of the coefficients are correct and when the level of the signal to be transmitted to the echo path rises again and an adaptation is permitted, the echo canceller is converged considerably more quickly than if the impulse response model were entirely diverged. A suitable margin is preferably such that the distance between the threshold level and the average noise level is about 1 to 5 dB larger than the echo path attenuation.

BRIEF DESCRIPTION OF THE DRAWINGS

The invention is explained in the following in greater detail by means of embodiments referring to the enclosed drawings, in which.

DETAILED DESCRIPTION OF THE INVENTION

Figure 1:
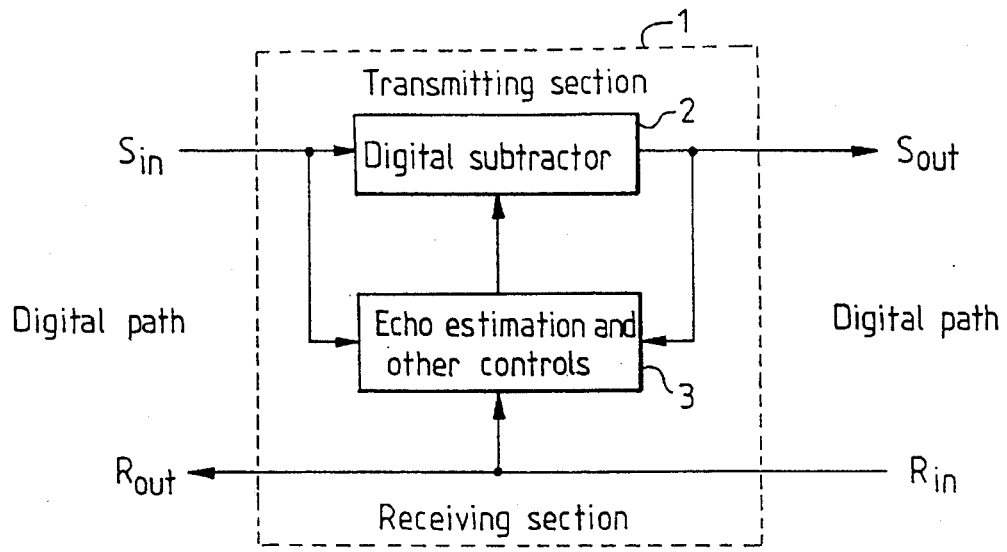
FIG. 1 shows a fundamental block diagram of an echo canceller, to which the invention can be applied.

FIG. 1 shows a schematic block diagram of a digital echo canceller. The digital echo canceller 1 comprises an input port Sin and an output port $S_{out}$ for a digital signal to be transmitted as well as an input port $R_{in}$ and an output port $R_{out}$ for a digital signal to be received. The echo canceller 1 shall eliminate the echo only in the transmission direction, which is called far end in this application. The opposite direction is called near end. In Figure i the ports $S_{in}$ and $R_{out}$ are connected to the transmission path of the near end and the ports $S_{out}$ and $R_{in}$ to the transmission path of the far end. The echo to be cancelled is a component r(i) of a speech signal x(i) received at the port $R_{in}$ from the far end and transmitted forward over the port $R_{out}$ to the near end (to the echo path), which component is reflected from the near end.

If the echo canceler did not operate, the echo r(i) of the far end speech signal x(i) received at the port $S_{in}$ would be transmitted as such over the port $S_{out}$ to the far end. When in operation, the echo canceller creates in a processing section 3 a model (an impulse response) of the echo path of the near end on the basis of the echo signal r(i) it has received at the port $S_{in}$, by means of which model it creates an echo estimate r'(i) from the signal x(i), which estimate is subtracted in a subtracting section 2 from the signal to be transmitted to the far end, and due to this, no echo at all is present at output $S_{out}$ in optimal case.

Figure 4:
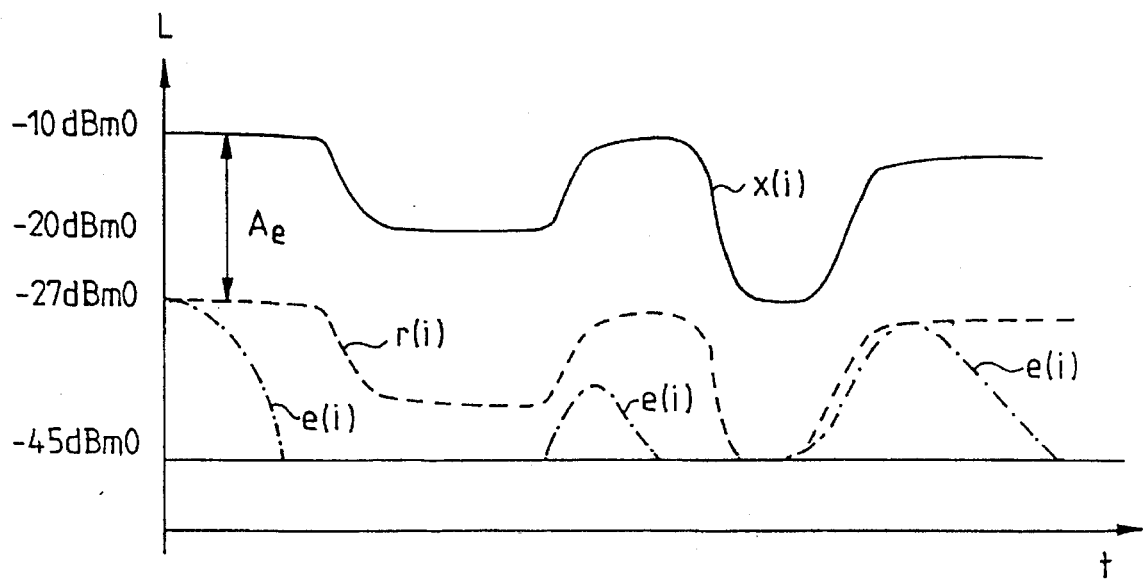
FIG. 4 is a graph illustrating the influence of noise on echo cancellation.

The diverging problem of the echo canceller constituting the background of the invention is studied next with reference to FIGS. 1 and 4. FIG. 4 illustrates the dependence of the level of the echo signal r(i) on the level of the speech signal x(i) of the far end. The difference between the levels of the speech signal x(i) received at the port $R_{in}$ and transmitted over the port $R_{out}$ to the near end and thus also to the echo path and the echo signal r(i) received at the port $S_{in}$ from the near end (echo path) corresponds to an attenuation $A_e$ of the echo path, i.e. $A_e=x(i)-r(i)$. In the example of FIG. 4 the echo path attenuation $A_e$ is 17 dB and the background noise level is −45 dBmO. When the level of the signal x(i) initially is −10 dBmO, the echo canceller is rapidly converged to the echo path and the echo path model created produces an accurate echo estimate r'(i), and thereby the echo component $e(i)=r(i)-r'(i)$, which has passed through the echo canceller, is attenuated to the noise level. If the level of the signal x(i) then falls (e.g. when speaking in a lower voice) to the level of −20 dBmO, for instance, the background noise begins to affect the echo path model created by the echo canceler in such a manner that the model diverges and does not correspond to the actual echo path accurately any longer. Then, at a sudden rise of the level of the signal x(i), a portion of the echo signal r(i) is passed through as a residual echo e(i). If the level of x(i) falls to the level of −27 dBmO, the echo signal r(i) is entirely covered by the noise and, in consequence of an adaptation of the echo canceller, the echo path model diverges entirely. If the level of x(i) now suddenly rises close to 10 dBmO, the echo signal r(i) passes through as such as a residual echo e(i), before the echo canceller is converged again. Echo is then momentarily observed during the speech. In the echo cancellers, the intention is that a little echo can be observed at the converging stage at the beginning of the speech, but after that no echo should be observed during the call any more.

According to the invention, the detrimental phenomenon is revented by preventing an adaptation of the echo canceller, when the level of the signal x(i) falls so much that a proper echo path model cannot be preserved any longer. This is carried out as follows:

When no one is speaking at either end of a speech connection (e.g. when the levels of the signals x(i) and y(i)<−35 dBmO), the average noise level of the echo path is determined or calculated. At the final stage of converging the echo canceller, taking place at the beginning of the call, the difference between the levels of the signals x(i) and r(i) is determined, from which difference is obtained the echo path attenuation $A_e$. After this an adaptation of the echo canceller during the call is prevented, if the level of the signal x(i) causing echo is lowered to a predetermined threshold level, which is to the extent of the total of a certain margin and the echo path attenuation above the calculated average noise level. The margin is such that an adaptation is prevented before the echo signal r(i) is covered by the noise. The margin ranges preferably from about 1 to 5 dB.

Figure 2:
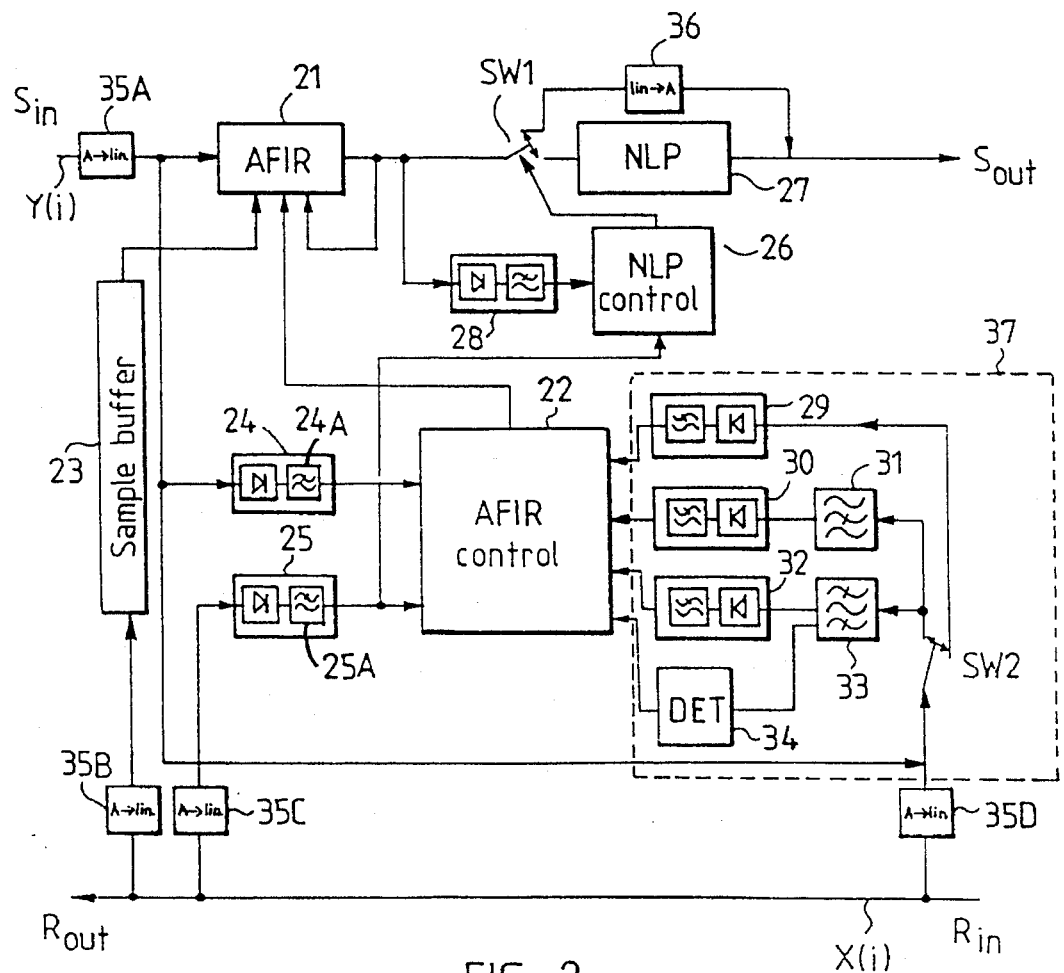
FIG. 2 shows a more detailed block diagram of the echo canceller of FIG. 1.

A more detailed block diagram of the digital echo canceller according to FIG. 1 is shown in FIG. 2. The transmission signal y(i) of the near end is linearized by an A-law converter 35A, processed by means of an adaptive FIR filter 21 and finally applied to a change-over switch SW1. The switch SW1 controlled by a control unit 26 connects the output of the filter 21 either over a non-linear processor 27 or an A-law converter 36 to the output port $S_{out}$ of the echo canceller.

The digital signal y(i) received at port $S_{in}$ is applied via the A-law converter 35A also to the input of a level detector 24. The level detector 24 provides digital samples representing level of the digital signal y(y). This function does not necessitate any additional circuitry since the input signal to the level detector 24 is already a digital signal, i.e., in the form of digital samples. However, as shown in FIG. 2, the level detector 24 preferably comprises a lowpass filtering 24A in order to obtain immunity against rapid transients in the received signal y(i). The digital output samples from the level detector 24 are applied to an input of a control circuit 22.

The digital signal x(i) received at the port $R_{in}$ and transmitted from part $R_{out}$ of the echo canceller is applied to a level detector 25 via an A-law converter 35C. The level detector 25 provides digital samples representing the level of the digital signal x(i). This function does not necessitate any additional circuitry, since the input signal to the level detector is already a digital signal, i.e., in form of digital samples. However, as shown in FIG. 2, the level detector 25 preferably comprises a lowpass filtering 25A in order to obtain immunity against rapid transients in the digital signal x(i). The digital output samples from the level detector 25 are applied to an input of the control circuit 22.

A control unit 22 controls the operation, adaptation and updating of the adaptive filter 21 on the basis of the levels of the signals y(i) and x(i), which levels are obtained by means of level. detectors 24 and 25, respectively, as well as on the basis of a disable tone detection, which is performed by means of a disable tone detection circuitry 37. On the basis of the level information received by the control unit 22 from the level detectors 24 and 25, the unit 22 determines the average noise level and an echo path attenuation $A_k$ and observes the level of the signal x(i) for the control of the adaptation of the filter 21 in a manner according to the invention.

More particularly, the control circuit 22 receives digital samples representing the level of the digital signals y(i) and x(i) from the level detectors 24 and 25, respectively. The attenuation $A_e$ of the echo path corresponds to the difference between detected signal levels of signals x(i) and y(i), as described above. Accordingly, the control unit 22 calculates the attenuation of the echo path $A_e=x(i)-y(i)$ on basis the digital samples outputted by the level detectors 24 and 25.

As described above, the level of the digital signal x(i) is equal to the background noise level of the echo path when the signal level x(i) is low, e.g., −27 dbmO. Accordingly, the control unit 22 calculates the average background noise level of the echo path from the signal level x(i) detected by the level detector 25 during silent moments in the telephone conversation as described above. Each sample outputted from the level detectors 25 to the control circuit 22 represents a momentary background noise level. The average background noise level is calculated from these samples by the control unit in normal manner, i.e., by calculating an average of several samples. For example, the average background noise level may be an average of six samples outputted by the level detector 25.

Subsequently, the control unit 22 calculates the predetermined threshold level which is equal to the sum of the average background noise level, the attenuation of the echo path and the predetermined margin, e.g. 1–5 db, as described above.

The signal x(i) is linearized by A-law converters 35B, 35C and 35D, before being applied to a sample buffer 23, the level detector 25 and the disable tone detection circuitry 37, respectively. Samples taken from the signal x(i) are stored in the sample buffer 23, from which they are applied, if needed, to the filter 21 for the calculation of a correlation between them and samples taken from the signal y(i). Coefficients $a_k$ of the filter 21 are updated on the basis of this correlation.

As described above, the control unit 22 monitors the signal level x(i) detected by the level detector 25 and compares the detected signal level to the above-mentioned threshold level. When the control unit 22 detects that the detected signal level falls to the threshold level, the control unit 22 prevents the adaptation of the digital filter 21, and thereby prevents divergence of the echo canceller.

Figure 3:
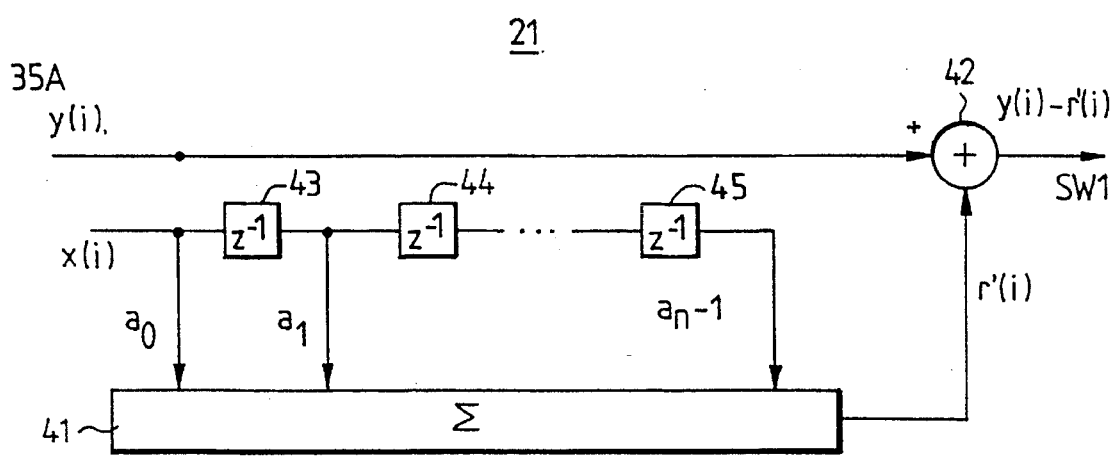
FIG. 3 shows a block diagram of the digital filter 21 of FIG. 2.

The adaptive digital filter 21 is for instance, a digital transversal filter, which models the impulse response of the echo path. FIG. 3 shows an explanatory illustration of an adaptive digital transversal filter, which can be used as a filter 21 in the echo canceler of FIG. 2. The signal y(i)+r(i) is a signal coming from the near end, i.e. from the port $S_{in}$. The filter 21 takes up samples from the signal x(i). The samples are delayed in delay sections $z^-$ with delay of one sample and the delayed samples are weighted by the coefficients $a_k=a_o, a_1, \ldots, a_{n-1}$ of the filter 21. Then the estimated echo signal produced by the filter 21 is $$r'(i) = \sum_{i=0}^{n} a_k x(i-k)$$

This echo estimate r'(i) is subtracted from the signal y(i)+r(i) in a subtracting section 42.

In the preferred embodiment of the invention, all the sections shown in FIG. 2 are embodied by means of software in a digital signal processor.

The invention has been described above in connection with particular exemplifying echo canceller types and digital transversal filters. However, the method of the invention can be applied to all echo cancellers using a digital filter for modelling the echo path.

The figures and the description relating to them are only intended to illustrate the present invention, anyway. As to the details, the method of the invention can vary within the scope of the attached claims.

I claim:

1. A method of preventing an adaptive echo canceller from diverging in a noisy environment, comprising the steps of:

converging a model of an echo path impulse response in an adaptive digital filter of said echo canceller which is operatively associated with said echo path to which a signal is to be transmitted, determining an average noise level in said echo path, determining an attenuation of the echo path, and preventing a divergence of said echo path impulse response in said noisy environment by disabling the adaptation of said adaptive digital filter, if the level of the signal to be transmitted to the echo path and causing echo is lower than a predetermined threshold level, which is to the extent of a predetermined margin and the echo path attenuation above the average noise level in said echo path.

2. A method according to claim 1, wherein:

said margin is about 1 to 5 dB.

3. A method according to claim 1, further including:

calculating said average noise level of the echo path on the basis of the noise level received from the echo path, when no one is speaking at either end of a speech connection involving said echo path.

4. A method according to claim 1, further including:

calculating said echo path attenuation on the basis of the difference between the signal level transmitted to the echo path and the signal level received from the echo path.

5. An adaptive echo canceller, comprising:

means for converging a model of an echo path impulse response in an adaptive digital filter of said echo canceller which is operatively associated with said echo path to which a signal is to be transmitted, means for determining an average noise level in said echo path, means for determining an attenuation of the echo path, and means for preventing a divergence of said echo path impulse response in a noisy environment by disabling the adaptation of said adaptive digital filter, if the level of the signal to be transmitted to the echo path and causing echo is lower than a predetermined threshold level, which is to be the extent of a predetermined margin and the echo path attenuation above the average noise level in said echo path.

6. The adaptive echo canceller of claim 5, wherein: said margin is about 1 to 5 db.

\* \* \* \* \*